(No Model.) 2 Sheets—Sheet 1.

W. MARX.
FRUIT OR VEGETABLE GRATER.

No. 374,611. Patented Dec. 13, 1887.

Witnesses:
T. R. Stuart
L. W. Farris

Inventor:
William Marx
By H. Gustave Roques
his Atty.

(No Model.) 2 Sheets—Sheet 2.

W. MARX.
FRUIT OR VEGETABLE GRATER.

No. 374,611. Patented Dec. 13, 1887.

Witnesses:
J. R. Stuart
L. W. Harris

Inventor:
William Marx
By H. Gustave Rogers
his Atty.

UNITED STATES PATENT OFFICE.

WILLIAM MARX, OF BEAVER FALLS, PENNSYLVANIA.

FRUIT OR VEGETABLE GRATER.

SPECIFICATION forming part of Letters Patent No. 374,611, dated December 13, 1887.

Application filed March 11, 1887. Serial No. 230,742. (No model.)

*To all whom it may concern:*

Be it known that I, WILLIAM MARX, residing at Beaver Falls, in the county of Beaver and State of Pennsylvania, have invented certain new and useful Improvements in Vegetable-Graters; and I do hereby declare the following to be a full, clear, and exact description of the invention, such as will enable others skilled in the art to which it appertains to make and use the same.

My invention relates to fruit or vegetable graters, and provides means for grating fruit or vegetables in an expeditious and convenient manner.

The object of my invention is to provide a grater which shall be easily constructed, be sufficiently strong for its purpose, and convenient to operate.

Figure 1:
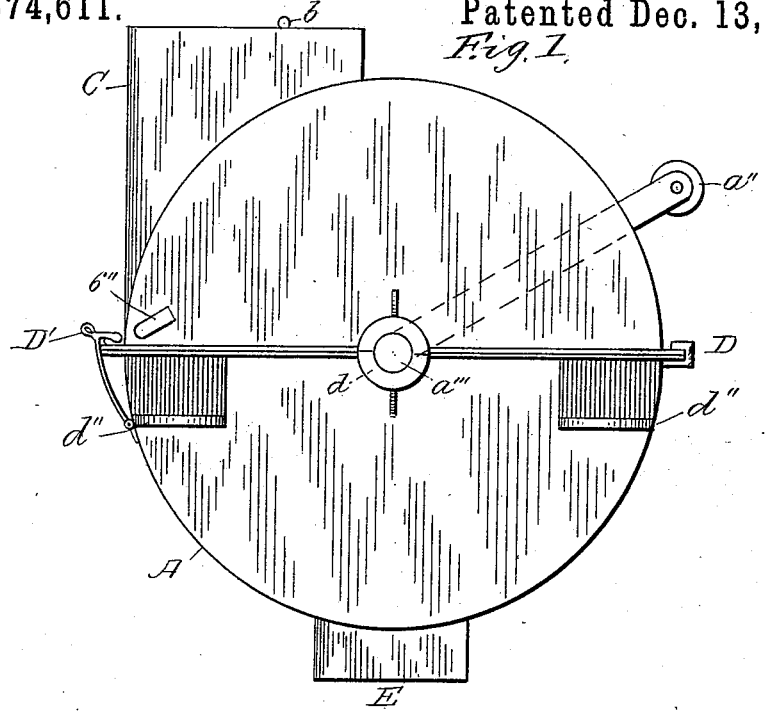
Figure 2:
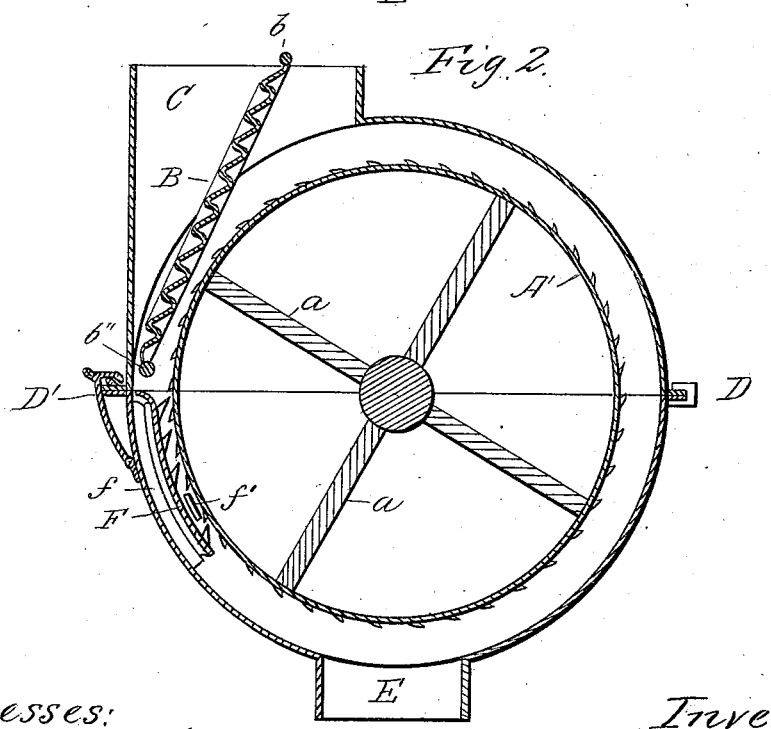
Figure 3:
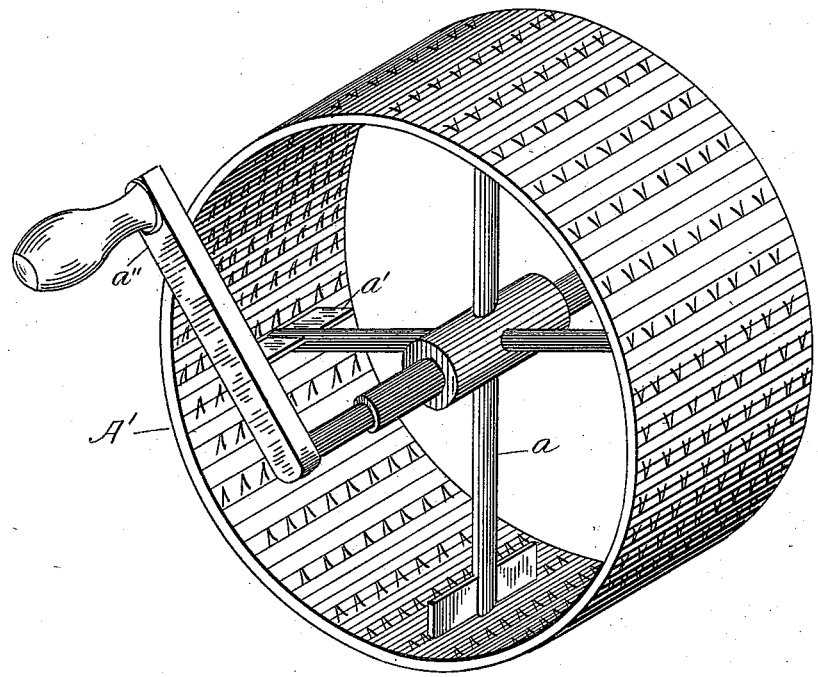
Figure 4:
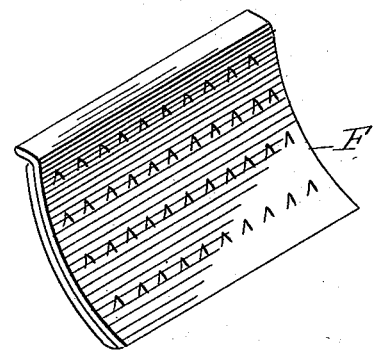

In the accompanying drawings, forming part of this specification, and in which the same letters indicate corresponding parts, Figure 1 is a front view of my invention, showing the outside box in two halves adapted to be separated. Fig. 2 is a vertical section of the same, showing the position of the grating-cylinder, the hopper and presser, and the scraper. Fig. 3 is a perspective view of the cylinder and shows the T-shaped spokes. Fig. 4 represents the scraper.

The inclosing-box A is made in two pieces, the catches D on one side acting as a hinge, and the clasp D' on the other side being used as a fastener, allowing the upper part to be thrown open for the purpose of examination.

d'' d'' are brackets, adapted to permit of the machine to be screwed or otherwise fastened to the side of a table.

A' represents the toothed cylinder, whose teeth may be stamped in the sheet of metal forming it before it is rolled up or cut in any desired method. It is attached to its spokes by means of cross-pieces a', which, with the spokes a, form T-pieces and add very materially to the strength of the construction. By means of the crank a'' the cylinder may be revolved. Any well-known motor may be used to transmit power.

B represents the presser, constructed with steps or corrugations, and provided with a rod, b, across its upper end, which, by projecting over the sides of the mouth of the hopper C, prevents the presser from coming in contact with the teeth of the grating-cylinder. The presser is pivoted on the bar b'', which passes through the box at a short distance above the line of the axis of the cylinder. By placing a weight on the upper end of the presser the material to be grated will be pressed onto the teeth of the cylinder. The form of the presser is straight and not curved, as it is desirable to give to the material to be grated a wedge shape as it comes down to the teeth of the cylinder. The steps or corrugations aid in preventing the material from sliding up from the cylinder.

F is the scraper, placed in front of the face of the cylinder and of equal width with it. In length it should be about one-eighth of the circumference of the cylinder, a greater length being found unnecessary. Such a size will allow of its being placed between the upper edges of the lower half of the box and the opening E. The scraper is provided with teeth of the same form as those of the cylinder, but cut in the opposite direction. The distance between it and the face of the cylinder should be equal to the desired size of the grated particles. The scraper is arranged to leave a space between it and the back of the inclosing-box for the purpose of allowing the particles that may adhere to the under side to be cleaned off. The sides of the box are provided with a beading, f, and one or more studs, f', which permit of the removal of the scraper whenever desirable, and yet retain it in position when the grater is in operation.

When it is required to grate either fruit or vegetables, the material is placed in the hopper and the presser held down upon it either by the hand or by means of a weight. The cross-rod b, extending over the sides of the mouth of the hopper, will prevent the presser from coming in contact with the grating-cylinder, and the steps or corrugations will give the presser a hold upon the material to be grated. Upon rotating the cylinder the grated particles will fall through the outlet or opening E into any suitable receptacle.

I am aware that prior to this application for patent grating-machines have been provided with scrapers extending over the larger part of the circumference of the cylinder and effectually precluding the placing of an outlet such as is shown in the lower part of my machine. I am also aware that pressers have been used to hold the material to be grated onto the cylinder; but such pressers do not, I believe, show the simple and effective construction which is possessed by my invention. Therefore I do not broadly claim either the scraper or the presser; but the specific construction and position of both one and the other I consider novel.

Having now fully described my said invention, what I claim is—

1. In a vegetable or fruit grater, the combination, with a box provided with a hopper and a toothed cylinder, of a movable presser formed with steps or corrugations pivoted in the box at its lower end and provided with a bar at its upper edge projecting over the sides of the mouth of the hopper, substantially as described, and for the purpose specified.

2. In a vegetable or fruit grater, the combination of a toothed cylinder supported on T-shaped spokes, a removable scraper of a size corresponding to less than one-half the circumference of the cylinder, an inclosing-box constructed in two parts, having a hopper in the upper part of said box, and a movable presser formed with steps or corrugations pivoted above the line of the axis of said cylinder and provided with a bar attached to its upper edge, substantially as described.

In testimony whereof I affix my signature in presence of two witnesses.

WILLIAM MARX.

Witnesses:
F. S. READER,
G. L. EBERHART.